(12) United States Patent
Rice et al.

(10) Patent No.: US 10,414,993 B2
(45) Date of Patent: Sep. 17, 2019

(54) METHODS AND COMPOSITIONS FOR VAPOR SUPPRESSION

(71) Applicant: NanoVapor Inc., The Woodlands, TX (US)

(72) Inventors: James Leonard Rice, Malvern, AR (US); Chad James Unrau, The Woodlands, TX (US)

(73) Assignee: NanoVapor, Inc., The Woodlands, TX (US)

( * ) Notice: Subject to any disclaimer, the term of this patent is extended or adjusted under 35 U.S.C. 154(b) by 3 days.

(21) Appl. No.: 15/280,666

(22) Filed: Sep. 29, 2016

(65) Prior Publication Data

US 2017/0088784 A1    Mar. 30, 2017

Related U.S. Application Data

(60) Provisional application No. 62/235,223, filed on Sep. 30, 2015.

(51) Int. Cl.

| | |
|---|---|
| *C10L 1/06* | (2006.01) |
| *C10L 10/18* | (2006.01) |
| *C10L 1/185* | (2006.01) |
| *C10G 29/22* | (2006.01) |
| *C10L 1/00* | (2006.01) |
| *C10L 1/10* | (2006.01) |
| *C10L 1/198* | (2006.01) |
| *B01J 19/16* | (2006.01) |
| *B05B 7/02* | (2006.01) |
| *C10L 1/12* | (2006.01) |

(52) U.S. Cl.
CPC .............. *C10L 1/06* (2013.01); *B01J 19/16* (2013.01); *B05B 7/02* (2013.01); *C10G 29/22* (2013.01); *C10L 1/006* (2013.01); *C10L 1/106* (2013.01); *C10L 1/1852* (2013.01); *C10L 1/1985* (2013.01); *C10L 10/18* (2013.01); *C10L 1/125* (2013.01); *C10L 2200/0423* (2013.01); *C10L 2230/08* (2013.01); *C10L 2230/14* (2013.01); *C10L 2250/06* (2013.01); *C10L 2270/023* (2013.01); *C10L 2290/18* (2013.01)

(58) Field of Classification Search
CPC combination set(s) only.
See application file for complete search history.

(56) References Cited

U.S. PATENT DOCUMENTS

| | | | |
|---|---|---|---|
| 4,235,743 A | 11/1980 | Canevari | |
| 4,326,986 A * | 4/1982 | Canevari | B01J 19/16 252/384 |
| 4,629,633 A | 12/1986 | Bespalov et al. | |
| 4,795,590 A | 1/1989 | Kent et al. | |
| 5,434,192 A | 7/1995 | Thach et al. | |
| 5,935,276 A | 8/1999 | DeRosa et al. | |
| 8,652,366 B2 | 2/2014 | Smyth et al. | |
| 2008/0287288 A1* | 11/2008 | Ying | B82Y 10/00 502/159 |
| 2011/0293941 A1* | 12/2011 | Chaumonnot | C01B 37/00 428/404 |
| 2013/0005774 A1* | 1/2013 | Loupenok | A61K 9/0014 514/336 |

FOREIGN PATENT DOCUMENTS

| | | |
|---|---|---|
| EP | 1693433 A1 | 8/2006 |
| GB | 1 264 681 A | 2/1972 |
| GB | 1 578 781 A | 11/1980 |

OTHER PUBLICATIONS

Extended European Search Report dated Apr. 26, 2019, issued in related European Application No. 16852613.5.

* cited by examiner

*Primary Examiner* — Ellen M McAvoy
*Assistant Examiner* — Chantel L Graham
(74) *Attorney, Agent, or Firm* — Cozen O'Connor

(57) ABSTRACT

The present invention is directed to vapor suppression of liquids through disposing a layer of surfactant onto the surfaces of liquids for surfactants having a density greater than the liquid and regardless of surface tension spreadability issues, and compositions comprising the surfactants in aerosolized form.

51 Claims, No Drawings

METHODS AND COMPOSITIONS FOR VAPOR SUPPRESSION

This application claims the benefit of U.S. Provisional Application 62/235,223, filed Sep. 30, 2015, which is hereby incorporated by reference in its entirety.

FIELD OF THE INVENTION

The present application is generally related to methods for applying a surfactant composition to bulk liquids thereby decreasing evaporative loss; and further to the application of the surfactant composition to evaporating surfaces to reduce the evaporation rate, while minimizing contamination by the surfactant composition.

BACKGROUND OF THE INVENTION

Transportation and storage of hydrocarbon fuels (e.g., gasoline) contribute to a significant amount of fuel lost to evaporation. In view of the rising need to conserve energy resources and the environmental impact associated with hydrocarbon vapors, there are presently far-reaching concerns about the economic loss and environmental impact from such fuel vapor emission. In addition, vapors generated from residual fuel, such as leftover puddles, in any vessel that requires maintenance or inspection represent a significant safety hazard to personnel working on that vessel. Hazardous flammable or toxic fumes also represent a commonplace danger to maintenance and/or inspection personnel because fuel must often be removed from the vessel before work can be performed, leaving the vessel filled with fumes.

Many surfactants and mixtures have been applied to liquid surfaces or other surfaces with absorbed and/or adsorbed liquids to reduce the evaporation rate of the liquid. In particular, one to several monolayers of close-packed linear surfactants have been added to water surfaces to reduce evaporation. Due to the high surface tension of water, surfactants can spread over the surface to reduce surface tension. Liquid hydrocarbons, on the other hand, typically have much lower surface tension, and hydrocarbon-based surfactants typically cannot spread across these liquid surfaces. Because of this, fluorosurfactants or trisiloxane surfactants are typically added in order to facilitate spreading on the surface. However, surfactants containing silicon and fluorine are known to generally present greater health and environmental hazards as compared to hydrocarbon-based surfactants. Some methods to encourage spreading of surfactants on low—surface tension surfaces involve fuel additives where surfactants are mixed with the bulk fuel. To achieve a layer on the surface of the bulk fuel in cases where physical mixture is the method of application, the state-of-the-art to date has required a surfactant having a lower density than the fuel, which allows the surfactant to assemble at gas/liquid interface, or the use of a surfactant containing an element such as fluorine or silicon that reduces the surface tension of the fuel.

And yet other surfactants that are applied directly to the surface of liquids, such as fuels, tend to contaminate or spoil the fuel. Currently, surfactant compositions are often applied to vessel surfaces by standard spray nozzles or cannons to physically mix with any remaining liquid and coat all surfaces. Such methods reduce the evaporation rate, but this inefficient use of the surfactant composition derives higher cost and higher contamination of the vessel, requiring cleaning before the vessel can be re-filled with liquid. Contamination of the liquid is particularly important when considering reducing the evaporation rate of bulk liquid hydrocarbons during transport or storage.

To accomplish minimal contamination while reducing evaporation rate as in the manner described above, the surfactant composition must be able to spread on the surface of a bulk liquid hydrocarbon. Since liquid hydrocarbons typically have a much lower surface tension than water, the surfactant composition may be required to contain special surfactants with fluorine or silicon as part of the surfactant chemical structure. When standard methods such as ordinary spray nozzles are used to apply this type of surfactant mixture, the special surfactants enable some droplets to spread on the liquid surface to form a layer to reduce evaporation. Even so, such methods and compositions often result in over-application from larger droplets sinking to the bottom of the liquid due to their higher density. This results in higher contamination and inefficient use of the surfactant mixture. Moreover, in cases where the evaporating surface area is not a continuous liquid surface such as a vessel drained of fuel, standard application methods of a surfactant composition such as spray nozzles must be able to reach all surfaces which is often not possible in large tanks or tanks with internal structure such as baffling. This results in poor coverage and higher evaporation rates.

Thus, there is a need in the art for methods and compositions that can reduce the evaporation of bulk liquids and/or liquids absorbed and/or adsorbed on various surfaces.

SUMMARY OF THE INVENTION

The present invention provides the benefits of reducing the evaporation rate of bulk liquids and liquids absorbed in and/or adsorbed on various surfaces, while avoiding the disadvantages described above of methods currently in the field.

In view of the above, a method is provided herein to dispose a layer of a surfactant composition onto the surface of a bulk liquid for compositions having a density greater than the bulk liquid and regardless of spreadability issues. The method further includes disposition of a layer of a surfactant composition onto surfaces with absorbed and/or adsorbed liquid such as vessel walls. The method further includes decreasing the evaporation rate of liquids while minimizing the amount of the surfactant composition used, thereby decreasing contamination of the liquids.

The compositions and methods described herein generally contemplates methods of, and compositions for, suppressing vaporization of bulk hydrocarbon liquids. One embodiment provides a method for disposing a liquid surfactant composition onto a bulk liquid to reduce evaporation of the bulk liquid. The method includes the steps of providing an aerosolized liquid surfactant composition having a mean droplet size of a single micelle to 1000 nm, and depositing the aerosolized liquid surfactant onto the surface of the bulk liquid to form a self-assembled layer thereon thereby reducing evaporation of the bulk liquid. In some embodiments, the deposited liquid surfactant composition has a bulk density greater than a bulk density of the bulk liquid and wherein the liquid surfactant composition does not spread onto the bulk liquid when applied in a non-aerosolized form.

The compositions and methods described herein also contemplate methods of and compositions for suppressing vaporization of liquid hydrocarbons from other surfaces that have absorbed and/or adsorbed hydrocarbon liquids such as vessel walls. In one embodiment, a method is described for disposing a surfactant composition onto wetted surfaces which are surfaces with absorbed and/or adsorbed liquids. In some embodiments, the liquid is on the surface by gravitational force. The method includes the steps of providing an aerosolized liquid surfactant composition, having a mean droplet size of a single micelle to 1000 nm, and depositing the aerosolized liquid surfactant onto wetted surfaces to form a layer thereon thereby reducing evaporation from the wetted surfaces. This embodiment minimizes the use of the surfactant composition and further minimizes contamination of bulk liquids coming into contact with the surfactant composition.

In another embodiment, a method is described for disposing a surfactant composition onto a bulk liquid to reduce evaporation of the bulk liquid contained in a vessel that is subsequently drained. The method includes the steps of providing an aerosolized liquid surfactant composition having a mean droplet size of a single micelle to 1000 nm, and depositing the aerosolized liquid surfactant onto the surface of the bulk liquid to form a self-assembled layer thereon, thereby reducing evaporation of the bulk liquid. In some embodiments, the deposited liquid surfactant composition has a bulk density greater than a bulk density of the bulk liquid and wherein the liquid surfactant composition does not spread onto the bulk liquid when applied in a non-aerosolized form. In some embodiments, draining the vessel of the bulk liquid disposes a layer of the surfactant composition on residual surface liquids. Further embodiments may include a method wherein the surfactant composition layer on the residual surface liquids re-assembles to form a layer on a bulk liquid upon refilling the vessel. This embodiment also minimizes contamination of the bulk liquids refilling the vessel.

In some embodiments, the step of providing an aerosolized liquid surfactant also includes flowing the liquid surfactant composition through an atomization nozzle to generate a stream of aerosolized liquid surfactant. In some embodiments, the aerosolized liquid surfactant has size distribution of droplets with a mean droplet size, as measured by subtracting the amount of evaporated water from the atomizing nozzle size distribution as measured by a standard relative humidity meter, of about one micelle to about 1000 nm. In some embodiments, the mean droplet size ranges from about one micelle to about 500 nm. In some embodiments, the mean droplet size ranges from about one micelle to about 200 nm. While not wishing to be bound by any theory, the average diameter of one micelle is about 4 nm to about 10 nm. In some embodiments, the aerosolized liquid surfactant comprise nano-sized droplets of about one micelle to about 1000 nm. In some embodiments, the nano-droplet size ranges from about one micelle to about 500 nm. In some embodiments, the nano-droplet size ranges from about one micelle to about 200 nm. While not wishing to be bound by any theory, the average diameter of one micelle is about 4 nm to about 10 nm. Further the size distribution of the nano-sized droplets can range from about one micelle to about 1000 nm.

In some embodiments, the atomization nozzle is a bifluidic, electrostatic, or ultrasonic nozzle or a combination thereof. Another embodiment includes a step of directing the stream of aerosolized liquid surfactant through an apparatus that includes a Venturi tube having an inlet, an outlet, and an elongated throat portion therebetween, wherein the atomization nozzle is positioned proximal to and in fluid communication with the inlet of the Venturi tube.

Another embodiment includes a step of directing the stream of aerosolized liquid surfactant through an apparatus that generates a highly turbulent gaseous flow to effect a further reduction in droplet size.

In some embodiments, the method includes heating or superheating the liquid surfactant composition prior to the flowing. In some embodiments, the method includes heating or superheating an atomizing gas. In some embodiments, the method includes heating or superheating an atomizing gas of the atomization nozzle.

Further embodiments include a bulk liquid that includes a hydrocarbon.

Some embodiments include a self-assembled layer that is about 1 to about 1000 monolayers in thickness. A more preferred thickness ranges from about 1 to about 500 monolayers. A most preferred thickness ranges from about 1 to about 350 monolayers.

In some embodiments, the aerosolized liquid surfactant composition has a mean droplet size of a single micelle to about 500 nm. A preferred droplet size ranges from a single micelle to about 250 nm.

In some embodiments, the aerosolized liquid surfactant composition comprises a non-ionic surfactant having an optionally branched $C_8$ to $C_{100}$ carbon chain.

In some embodiments, the surfactant composition contains a non-ionic surfactant with a hydrophilic-lipophilic balance (HLB) of greater than 10, which a person of ordinary skill in the art would necessarily understand to denote that water solubility of the surfactant increases with higher HLB value.

In some embodiments, the aerosolized liquid surfactant composition comprises water in a concentration of about 1% w/v to about 50% w/v. Preferably, the aerosolized liquid surfactant composition comprises water in a concentration of about 1% w/v to about 25% w/v. More preferably, the aerosolized liquid surfactant composition comprises water in a concentration of about 1% w/v to about 10% w/v.

In some embodiments, the aerosolized liquid surfactant composition comprises a polyglycol. Preferably, the polyglycol is present in a ratio of 10:1 by weight to 1:10 by weight relative to the total weight of surfactant in the aerosolized surfactant composition. A person of ordinary skill in the art necessarily understands that the total weight of surfactant includes one surfactant or a mixture of surfactants in the aerosolized surfactant composition. The polyglycol is preferably polyethylene glycol.

Some embodiments include an aerosolized composition which includes a non-ionic surfactant having an optionally branched $C_8$ to $C_{100}$ carbon chain, water in a concentration of about 1% w/v to about 50% w/v, and a polyglycol, wherein the polyglycol is present in a ratio of 10:1 by weight to 1:10 by weight relative to the surfactant, and wherein the mean droplet size ranges from a single micelle to 1000 nm. In some embodiments, the aerosol size distribution includes droplets from a single micelle to 1000 nm.

In some embodiments, the surfactant composition contains a non-ionic surfactant with a hydrophilic-lipophilic balance (HLB) of greater than 10, which a person of ordinary skill in the art would necessarily understand to denote that water solubility of the surfactant increases with higher HLB value. The composition may also include a polyglycol wherein the polyglycol is polyethylene glycol.

Further embodiments provide that the water is present in a concentration of about 1% w/v to about 25% w/v. Preferably, the water is present in a concentration of about 1% w/v to about 10% w/v.

In some embodiments, the composition includes a bulk hydrocarbon liquid, a liquid surfactant composition disposed thereon having a thickness of 1 to about 1000 monolayers.

The liquid surfactant composition consisting essentially of a non-ionic surfactant having an optionally branched $C_8$ to $C_{100}$ carbon chain, water in a concentration of about 1% w/v to about 50% w/v, and a polyglycol, wherein the polyglycol is present in a ratio of 10:1 by weight to 1:10 by weight relative to the total amount of surfactant. In some embodiments, the liquid surfactant composition has a bulk density greater than a bulk density of the bulk hydrocarbon liquid.

In some embodiments, the surfactant composition contains a non-ionic surfactant with a hydrophilic-lipophilic balance (HLB) of greater than 10, which a person of ordinary skill in the art would necessarily understand to denote that water solubility of the surfactant increases with higher HLB value. Other embodiments provide that the polyglycol is polyethylene glycol.

In some embodiments, the water is present in a concentration of about 1% w/v to about 25% w/v. Preferably, the water is present in a concentration of about 1% w/v to about 10% w/v.

DETAILED DESCRIPTION OF THE EMBODIMENTS

The embodiments of the invention and the various features and advantages thereto are more fully explained with references to the non-limiting embodiments and examples that are described and set forth in the following descriptions of those examples. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the claims.

As used herein, terms such as "a," "an," and "the" include singular and plural referents unless the context clearly demands otherwise. For example, "a surfactant" includes one or more surfactants, and "a surfactant composition" includes one or more surfactants in the composition.

As used herein, terms such as "mean droplet size" necessarily includes a distribution of droplets that are nano-sized droplets.

In general, reducing evaporation of a bulk liquid comprises disposing a layer of a surfactant composition such that at least a single monolayer substantially covers the surface of the bulk liquid. The layer of the surfactant composition acts as barrier film between the liquid and gas interface at the surface of the bulk liquid to inhibit vaporization of the bulk liquid. The thickness of the layer directly contributes to in preventing evaporation of the bulk liquid. The thickness of the surfactant composition layer is at least one monolayer but can be as thick as 1000 monolayers. The preferred layer thickness ranges from about 70 to 500 monolayers. Most preferred layer thickness ranges from about 200 to about 400 monolayers. In other embodiments water interacting with the hydrophilic head group provides a thin layer of water over the bulk liquid surface for further retardation of evaporation. A person of skill in the art necessarily understands that the amount of surfactant and the layer thickness thereof depresses the vapor pressure of the bulk liquid in addition to physically impeding phase change of the bulk liquid to a gas.

The method also reduces evaporation of surface liquids by disposing a layer of a surfactant composition such that at least a single continuous monolayer substantially covers the surface. The layer of the surfactant composition acts as barrier film at the liquid/gas interface to inhibit vaporization of a surface liquid, such as a liquid absorbed in and/or adsorbed on a solid vessel wall. The thickness of the layer directly contributes to preventing evaporation from such surfaces. The thickness of the surfactant composition layer is at least one monolayer but can be as thick as 1000 monolayers. The preferred layer thickness ranges from about 70 to 500 monolayers. Most preferred layer thickness ranges from about 200 to about 400 monolayers. In other embodiments water interacting with the hydrophilic head group provides a thin layer of water over the evaporating surface for further retardation of evaporation. A person of skill in the art necessarily understands that the amount of surfactant and the layer thickness thereof impedes the rate of phase change of the wetted surface liquid to a gas.

The method of disposing a surfactant to reduce evaporation described herein is contemplated to apply to bulk and wetted surface liquids in general. However, the preferred bulk and/or wetted surface liquid is a volatile organic solvent. Some exemplary organic solvents include aliphatic alkanes, cyclic alkanes, aromatics, heterocycles, gasolines, other hydrocarbon fuels, and the like. The foregoing liquids are merely exemplary and are not intended to be limiting.

Application of a surfactant normally decreases surface tension to drive dispersion across the surface of high surface tension liquids such as water. However, liquid hydrocarbons typically have much lower surface tension and adding a hydrocarbon-based surfactant does not lower the surface tension enough to result in spreading. As such, it is preferred to atomize a liquid surfactant composition into nano-sized droplets, and dispersing the resulting aerosolized surfactant with a carrier gas over the bulk liquid thereby depositing an even distribution of the surfactant onto the surface of the bulk liquid. Once deposited on the surface of the bulk liquid, the surfactant self-associate into a layer. Self-assembly is driven by intermolecular attraction of the surfactant tails. If water is present, the interfacial tension between the water top layer and hydrocarbon bulk liquid surface provides an additional driving force for the surfactant molecules to self-assemble across the bulk liquid surface into a layer. Additionally, the interfacial tension drives re-sealing of the water surfactant layer over the bulk liquid surface if the surface is disturbed.

The nano-droplets may be generated by flowing a liquid surfactant composition through an atomization nozzle to create an aerosol mist followed by dilution and at least partial vaporization by a, preferably dry, carrier gas to create nano-droplets. To facilitate generating nano-droplets, the liquid surfactant composition may be heated or superheated prior to flowing through the atomization nozzle such that nano-droplets are emitted from the nozzle. The atomization nozzle may be a bifluidic, electrostatic, or ultrasonic nozzle. One of skill in the art necessarily recognizes that the design of the atomization nozzle can be any nozzle design suitable for generating a fine aerosol mist. Nano-sized droplets provide several advantages. First, such droplets diffuse and deposit quickly due to their small size resulting in fast application times to achieve the desired reduction in evaporation. Second, surfactant nano-sized droplets will cover all surfaces regardless of any spreadability issues. Third, surfactant nano-sized droplets are light, resulting in the ability to deposit and spread on the surface of a liquid instead of sinking to the bottom of the liquid resulting in efficient use of the surfactant mixture to minimize cost and contamination.

Thus, the method further includes disposing surfactant nano-sized droplets to reduce evaporation of surfaces that are not always continuous and that have evaporating liquids, such as vessel walls having surface liquids. The method further includes using an amount such that contamination of the evaporating liquid is minimized. The preferred evaporating liquid is a volatile organic solvent. Some exemplary organic solvents include aliphatic alkanes, cyclic alkanes, aromatics, heterocycles, gasolines, other hydrocarbon fuels, and the like. The foregoing liquids are merely exemplary and are not intended to be limiting.

The liquid surfactant composition comprises a surfactant or surfactant mixture and a solvent. The preferred surfactants are non-foaming and have non-ionic hydrophilic head groups that include ethoxylated linear alcohols, ethoxylated alkyl phenols, fatty acid esters, amine and amide derivatives, alkylpolyglucosides, ethyleneoxide/propyleneoxide copolymers, polyalcohols and ethoxylated polyalcohols. The foregoing examples are merely exemplary and are not intended to be limiting. Although the surfactants having the requisite characteristics include a broad class of hydrocarbon surfactants, the contemplated surfactants consist of carbon, hydrogen, and oxygen. Accordingly, substituted surfactants such as halogenated surfactants and silicon based surfactants are examples of excluded classes.

In other embodiments, the preferred surfactants are foaming, and include substituted surfactants such as halogenated surfactants and silicon based surfactants.

The preferred surfactants also comprise a hydrophobic tail. The hydrophobic tail may be a linear hydrocarbon or a branched hydrocarbon having a chain length greater than 8 carbons. Preferably the chain length ranges from about 35 carbons to about 100 carbons. More preferably the chain length ranges from about 45 to 80 carbons. Most preferably, the chain length ranges from about 50 to 75 carbons. In some embodiments, the surfactant composition contains a non-ionic surfactant with a hydrophilic-lipophilic balance (HLB) of greater than 10, which a person of ordinary skill in the art would necessarily understand to denote that water solubility of the surfactant increases with higher HLB value.

The preferred surfactant composition has a density in their bulk form that is greater than the density of the bulk liquid to which the compositions are applied. In the case that the bulk liquid comprises a hydrocarbon or mixture of hydrocarbons, the preferred surfactants in their bulk liquid form will have a density equal to or greater than that of the bulk hydrocarbon liquid. In practice the preferred surfactants are deposited onto the surface as a composition having a nano-droplet structure. Introduction of the surfactant compositions in a form other than a nano-droplet aerosol composition (e.g., by mixing, dropwise addition, and the like) may undesirably result in the surfactant mixing with the bulk liquid and/or settling to the bottom of the bulk liquid.

In other embodiments, the preferred surfactant compositions have a density that is less than the density of the bulk liquid.

Solvents for use in the surfactant compositions of the present invention include those solvents in which the surfactant is at least partially soluble. In some embodiments, the surfactant has a solubility in the solvent of at least 1 g/mL or more. In some embodiments, the solvent is at least partially miscible with water. Preferred solvents for use with the surfactant compositions of the present invention include but are not limited to water, alcohols (e.g., methanol, ethanol, propanols, butanols, and longer chain and/or cyclic alcohols that are liquids at ambient conditions), dimethyl sulfoxide (DMSO), dimethyl formamide (DMF), tetrahydrofuran (THF), acetaldehyde, acetic acid, acetone, acetonitrile (ACN), ethylamine, mannitol, pyridine, butyric acid, diethanolamine, diethylenetriamine, dimethoxyethane, 1,4-dioxane, ethylene glycol, furfuryl alcohol, glycerol, and the like and combinations thereof.

The preferred concentration of solvent in the liquid surfactant composition is greater than or equal to about 50% w/v. A person of skill in the art necessarily understands that solvent concentration and the resulting particle size of the aersolized product are inversely related. As such, the solvent concentration discussed above is merely exemplary and may vary according to a desired particle size.

An apparatus for aerosol generation as described in U.S. Provisional Application Ser. No. 62/148,597, herein incorporated by reference in its entirety, may be used to create an aerosol containing nano-droplets and disperse the resulting nano-sized droplets comprising the surfactant composition. In some embodiments, an apparatus for aerosol generation includes an atomization nozzle and a Venturi tube with an inlet, an outlet and an elongated throat portion containing at least to rings of gas jets therebetween. The atomization nozzle is preferably positioned near the inlet of the Venturi tube. As the fine aerosol mist is emitted from the atomizing nozzle the carrier gas directs the aerosolized surfactant composition into the inlet for further reduction in the size of the droplets. In some embodiments, the apparatus for aerosol generation comprises such a Venturi tube or two or more Venturi tubes in series.

Water comprises about 1 to about 50% w/v of the nano-droplet. Preferably the water comprises about 1 to about 25% w/v of the nano-droplet. More preferably, the water comprises about 1 to about 10% w/v of the nano-droplet.

The nano-droplet may also comprise a polyglycol at a ratio of about 10:1 by weight to about 1:10 by weight relative to the total weight of surfactant. A person of ordinary skill in the art necessarily understands that the total weight of surfactant includes one or more surfactants. Preferred polyglycols have a molecular weight of about 100 to 1200. Preferably the molecular weight of the polyglycol is about 400. Preferred polyglycols include polyethylene glycol and polypropylene glycol. A preferred polyglycol is polyethylene glycol. In embodiments in which the polyglycol has a molecular weight distribution, the molecular weight refers to the number average molecular weight.

The size of each nano-sized droplet ranges from about one micelle to about 1000 nm. In some embodiments, the droplet size ranges from about one micelle to about 500 nm. In some embodiments, the nano-droplet size ranges from about one micelle to about 200 nm. While not wishing to be bound by any theory, the average diameter of one micelle is about 4 nm to about 10 nm. Further, the nano scale size of the droplets prevents the surfactant composition from sinking through the bulk liquid. Further the size distribution of the nano-sized droplets can range from about one micelle to about 1000 nm.

EXAMPLES

Certain features and aspects of the present invention are illustrated in the following working examples. The working examples are merely exemplary which are strictly demonstrative and not to be construed as limiting in scope Example 1

A 75,000 liter tank measuring 0.3 meters in diameter and 12 meters long was charged with fifty liters of commercial gasoline to generate fuel vapors. The temperature and humidity in the tank was 20.5° C. and 60% RH respectively.

The tank was degassed using the apparatus described in U.S. application Ser. No. 15/131,885 with 6 bar compressed air pressure applied to it from a standard compressor. The surfactant solution applied by the apparatus was such that the nano-droplets exiting the apparatus included approximately 49% w/v of a $C_8$ linear alcohol ethoxylate, approximately 49% w/v polyethylene glycol, and approximately 2% w/v water. The average droplet size exiting the apparatus was approximately 150 nm. This was determined by measuring the amount of water evaporated off of the droplets of the initial size distribution at the exit of the apparatus based on the change in relative humidity of the air stream as measured by a standard relative humidity meter. The initial size distribution was generated using a standard bifluid nozzle for first stage atomization in the apparatus with an average droplet size of 2 microns. The nano-droplets were applied to the tank for 15 minutes. The fuel vapor concentration was measured in the headspace prior to application and measured 80% of the lower explosive limit (LEL). After 15 minutes of application the concentration read 0% of LEL for approximately 48 hours, thereby demonstrating a significant reduction in fuel evaporation.

The conditions of Example 1 were repeated except that the humidity in the tank was 98% RH. Although the concentration was 0% of LEL after 15 minutes, after 48 hours the concentration was 25% of LEL, thereby indicating a much higher evaporation rate of the fuel. At 98% RH, most of the water does not evaporate off of the droplets resulting in mostly micron-sized droplets that are too large to deposit and remain on the liquid fuel surface The example illustrates possible embodiments of the present invention. While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description, Summary, and Abstract sections can set forth one or more, but not all exemplary embodiments of the present invention as contemplated by the inventor(s), and thus, are not intended to limit the present invention and the appended claims in any way.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method for disposing a surfactant onto a bulk liquid to reduce evaporation of the bulk liquid, the method comprising:
   providing an aerosolized liquid surfactant composition having nano-sized liquid surfactant droplets ranging in size from about one micelle to about 1000 nm;
   depositing the aerosolized liquid surfactant composition onto the surface of the bulk liquid to form a self-assembled layer thereon thereby reducing evaporation of the bulk liquid, wherein the liquid surfactant composition has a bulk density greater than the bulk density of the bulk liquid; and
   decreasing the evaporation rate of the bulk liquid.

2. The method of claim 1, wherein the nano-sized liquid surfactant droplets have a mean droplet size ranging from one micelle to 1000 nm.

3. The method of claim 1, further comprising an additional step of exposing the liquid surfactant droplets to a highly turbulent gaseous flow to further reduce the droplet size of the liquid surfactant droplets.

4. The method of claim 1, further comprising heating or superheating the liquid surfactant composition.

5. The method of claim 1, further comprising exposing the liquid surfactant composition to a heated or superheated atomizing gas.

6. The method of claim 1, wherein the bulk liquid comprises a hydrocarbon.

7. The method of claim 1, wherein the self-assembled layer comprises 1 to about 1000 monolayers.

8. The method of claim 1, wherein the layer comprises 1 to about 500 monolayers.

9. The method of claim 1, wherein the layer comprises 1 to about 350 monolayers.

10. The method of claim 2, wherein the liquid surfactant droplets have a mean droplet size of a single micelle to 500 nm.

11. The method of claim 2, wherein the liquid surfactant droplets have a mean droplet size of a single micelle to 250 nm.

12. The method of claim 1, wherein the aerosolized liquid surfactant composition comprises a non-ionic surfactant having an optionally branched $C_8$ to $C_{100}$ carbon chain.

13. The method of claim 12, wherein the non-ionic surfactant has a hydrophilic-lipophilic balance of greater than 10.

14. The method of claim 1, wherein the aerosolized liquid surfactant composition comprises water in a concentration of about 1% w/v to about 50% w/v.

15. The method of claim 1, wherein the aerosolized liquid surfactant composition comprises water in a concentration of about 1% w/v to about 25% w/v.

16. The method of claim 1, wherein the aerosolized liquid surfactant composition comprises water in a concentration of about 1% w/v to about 10% w/v.

17. The method of claim 1, wherein the aerosolized liquid surfactant composition comprises a polyglycol.

18. The method of claim 17, wherein the polyglycol is present in a ratio of 10:1 by weight to 1:10 by weight relative to the total weight of surfactant.

19. The method of claim 17, wherein the polyglycol is polyethylene glycol.

20. An aerosolized composition consisting essentially of:
    a non-ionic surfactant having an optionally branched $C_8$ to $C_{100}$ carbon chain,
    water in a concentration of about 1% w/v to about 50% w/v, and
    a polyglycol,
    wherein the polyglycol is present in a ratio of 10:1 by weight to 1:10 by weight relative to the total weight of surfactant, and wherein the mean droplet size ranges from a single micelle to 1000 nm.

21. The aerosolized composition of claim 20, wherein the non-ionic surfactant has a hydrophilic-lipophilic balance of greater than 10.

22. The aerosolized composition of claim 20, wherein the polyglycol is polyethylene glycol.

23. The aerosolized composition of claim 20, wherein the water is present in a concentration of about 1% w/v to about 25% w/v.

24. The aerosolized composition of claim 20, wherein the water is present in a concentration of about 1% w/v to about 10% w/v.

25. A composition comprising:
   a bulk hydrocarbon liquid;
   a liquid surfactant composition disposed thereon having a thickness of 1 to about 1000 monolayers, the liquid surfactant composition consisting essentially of:
      a non-ionic surfactant having an optionally branched $C_8$ to $C_{100}$ carbon chain,
      water in a concentration of about 1% w/v to about 50% w/v, and
      a polyglycol, wherein the polyglycol is present in a ratio of 10:1 by weight to 1:10 by weight relative to the total weight of surfactant,
   wherein the liquid surfactant composition has a bulk density greater than a bulk density of the bulk hydrocarbon liquid.

26. The composition of claim 25, wherein the non-ionic surfactant has a hydrophilic-lipophilic balance of greater than 10.

27. The composition of claim 25, wherein the polyglycol is polyethylene glycol.

28. The composition of claim 25, wherein the water is present in a concentration of about 1% w/v to about 25% w/v.

29. The composition of claim 25, wherein the water is present in a concentration of about 1% w/v to about 10% w/v.

30. A method for disposing a surfactant onto an evaporating surface to reduce evaporation from the evaporating surface, the method comprising:
   providing an aerosolized liquid surfactant composition having nano-sized droplets;
   depositing the aerosolized liquid surfactant composition onto the surface to form a layer thereon; and
   decreasing the evaporation rate from the evaporating surface.

31. The method of claim 30, wherein the nano-sized droplets range from one micelle to 1000 nm.

32. The method of claim 30, wherein the aerosolized liquid surfactant composition has a mean droplet size ranging from one micelle to 1000 nm.

33. The method of claim 30, wherein the providing further comprises flowing the liquid surfactant composition through an atomization nozzle to generate a stream of aerosolized liquid surfactant.

34. The method of claim 33, wherein the atomization nozzle is a bifluidic, electrostatic, or ultrasonic nozzle.

35. The method of claim 33, further comprising directing the stream of aerosolized liquid surfactant through an apparatus comprising a Venturi tube having an inlet, an outlet, and an elongated throat portion containing at least two rings of jets therebetween, wherein the atomization nozzle is positioned proximal to and in fluid communication with the inlet of the Venturi tube.

36. The method of claim 33, further comprising heating or superheating the liquid surfactant composition prior to the flowing.

37. The method of claim 34, further comprising heating the atomizing gas of the bifluidic nozzle.

38. The method of claim 30, wherein the evaporating surface comprises a liquid hydrocarbon.

39. The method of claim 30, wherein the self-assembled layer comprises 1 to about 1000 monolayers.

40. The method of claim 30, wherein the layer comprises 1 to about 500 monolayers.

41. The method of claim 30, wherein the layer comprises 1 to about 350 monolayers.

42. The method of claim 32, wherein the aerosolized liquid surfactant composition has a mean droplet size ranging from one micelle to 500 nm.

43. The method of claim 32, wherein the aerosolized liquid surfactant composition has a mean droplet size ranging from one micelle to 250 nm.

44. The method of claim 30, wherein the aerosolized liquid surfactant composition comprises a non-ionic surfactant having an optionally branched $C_8$ to $C_{100}$ carbon chain.

45. The method of claim 44, wherein the non-ionic surfactant has a hydrophilic-lipophilic balance of greater than 10.

46. The method of claim 30, wherein the aerosolized liquid surfactant composition comprises water in a concentration of about 1% w/v to about 50% w/v.

47. The method of claim 30, wherein the aerosolized liquid surfactant composition comprises water in a concentration of about 1% w/v to about 25% w/v.

48. The method of claim 30, wherein the aerosolized liquid surfactant composition comprises water in a concentration of about 1% w/v to about 10% w/v.

49. The method of claim 48, wherein the aerosolized liquid surfactant composition comprises a polyglycol.

50. The method of claim 49, wherein the polyglycol is present in a ratio of 10:1 by weight to 1:10 by weight relative to the total weight of surfactant.

51. The method of claim 49, wherein the polyglycol is polyethylene glycol.

* * * * *